Patented Sept. 15, 1931

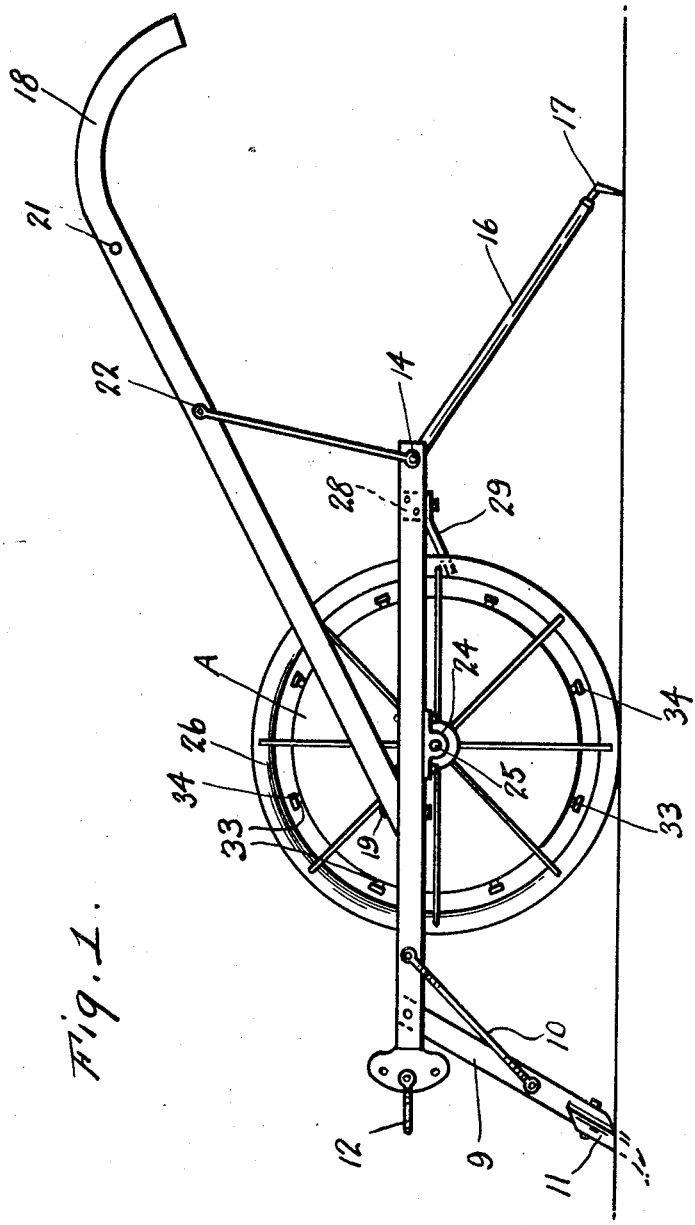

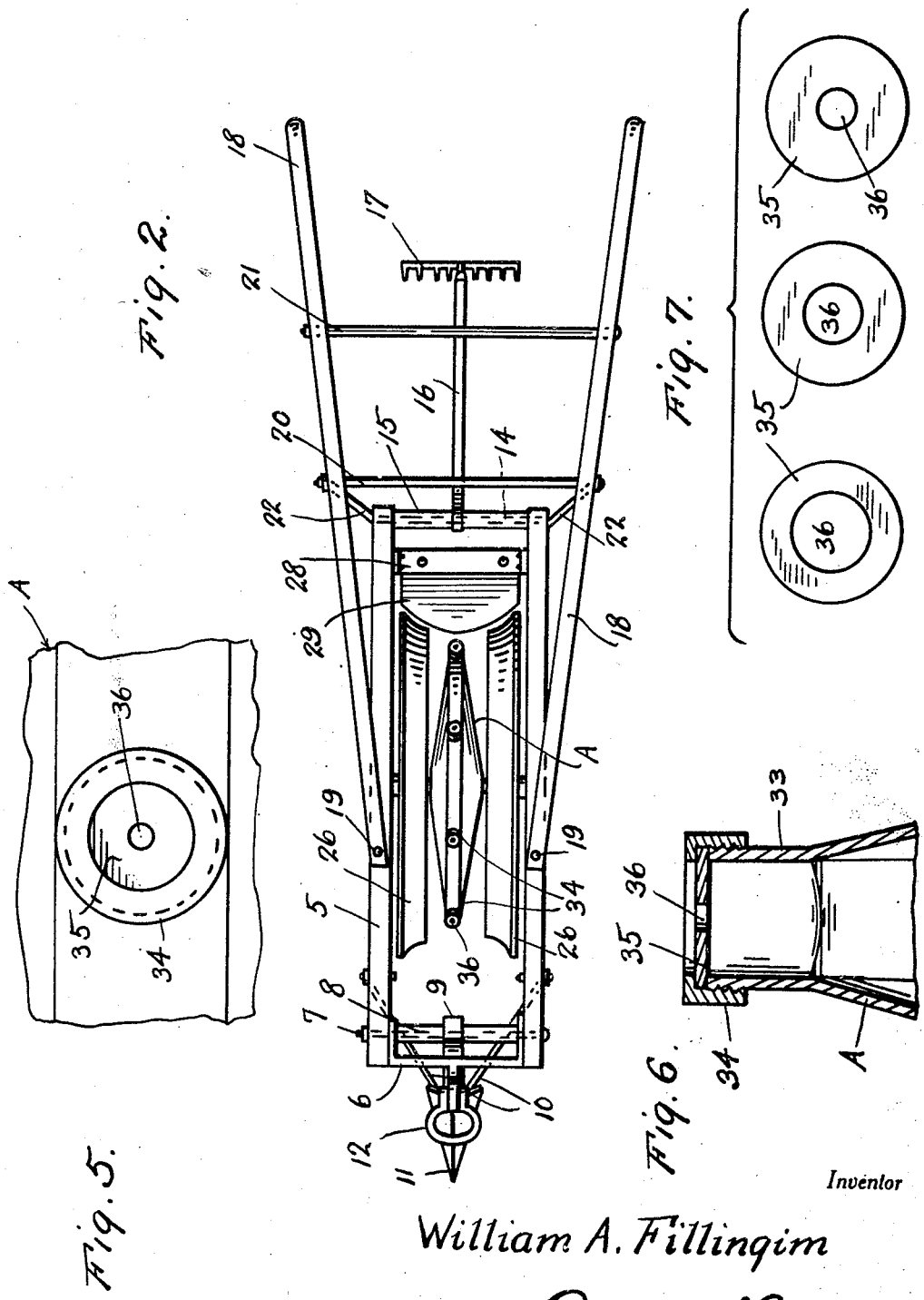

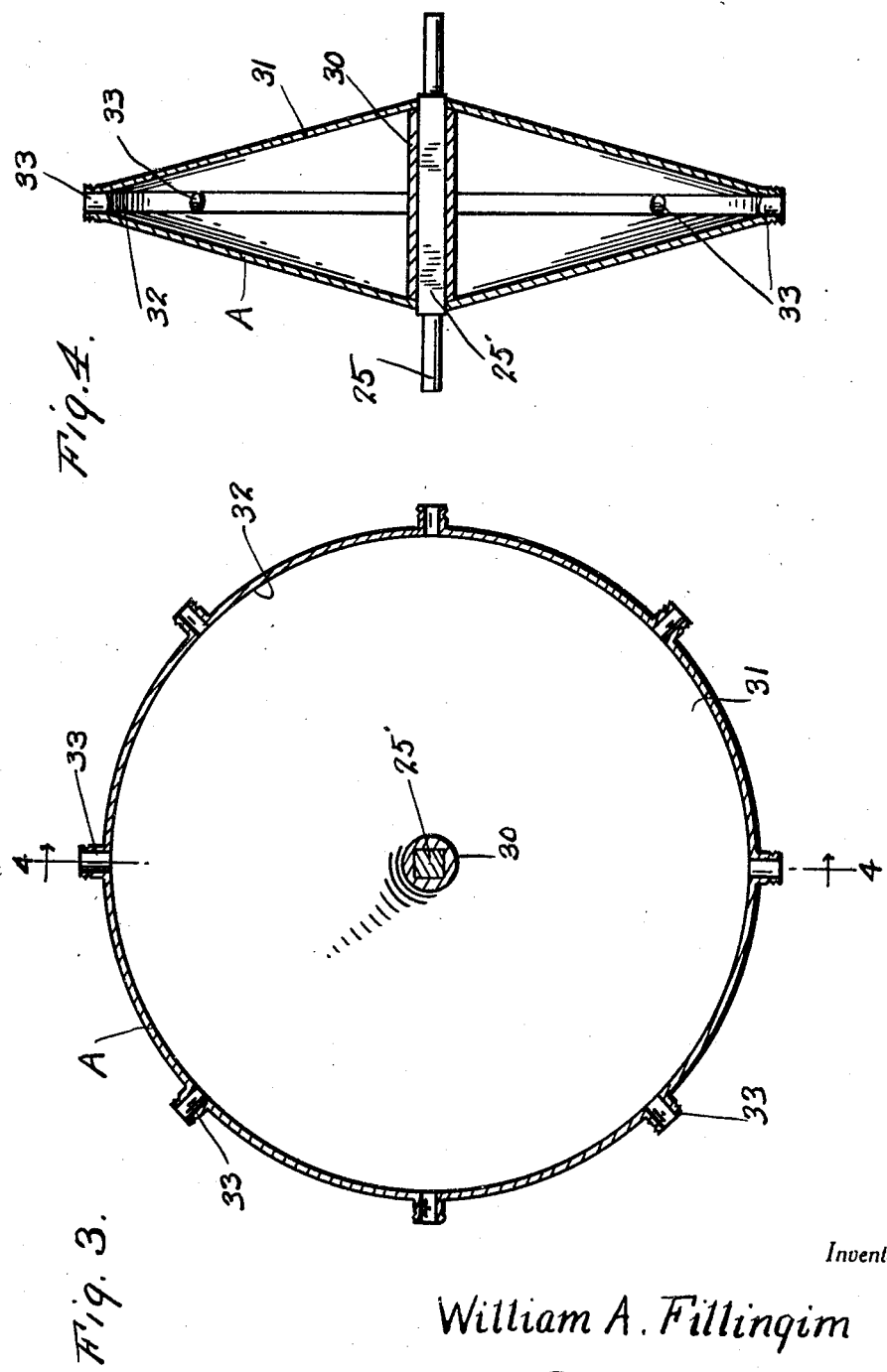

1,823,392

UNITED STATES PATENT OFFICE

WILLIAM A. FILLINGIM, OF KOUNTZE, TEXAS

SEED PLANTER

Application filed September 15, 1930. Serial No. 482,023.

The present invention relates to a planter which includes means for digging a furrow and planting seeds therein at spaced intervals and covering the furrow.

The objects of the invention are to provide a planting apparatus of this nature which is exceedingly simple in its construction, compact and convenient in its arrangement of parts, easy to handle, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the apparatus embodying the features of my invention, Figure 2 is a top plan view thereof, Figure 3 is a vertical section through the feed container, Figure 4 is a transverse section therethrough taken substantially on the line 4—4 of Figure 3, Figure 5 is an end view of one of the distributing necks, Figure 6 is a sectional view therethrough, and Figure 7 is a plan view showing a group of disks with different sized openings therein.

Referring to the drawings in detail it will be seen that numerals 5 denote a pair of spaced parallel coextensive side bars. A U-shaped cross member 6 is disposed between the front ends of the side bars being held in place by a tie rod 7 having spaces 8 thereon with the upper end of a stock 9 therebetween, the tie rod passing through said end of the stock. This stock 9 inclines downwardly and forwardly and is braced with respect to the side bars by suitable rods 10. On the lower end of the stock is a furrow forming element 11. A suitable hitch structure 12 is extended forwardly of the center of the cross member 6. A tie rod 14 is disposed between the rear ends of the side bars 5 and has a spacer 15 thereon between which is one end of a shank 16 rockable on the tie rod 14.

A rake 17 is carried by the shank 16. Handles 18 are fastened to forward intermediate portions of the side bars 5 as is indicated at 19 and incline upwardly and rearwardly and diverge rearwardly from each other and are connected together by tie rods 20 and 21. Braces 22 extend from the ends of the tie rod 20 to the ends of the tie rods 14.

Depending from the central portion of the side bars are bearings 24 in which is journalled a shaft 25. A distributing container A is mounted on the center of this shaft to rotate therewith and wheel sections 26 are mounted on this shaft 25 one to each side of the distributing container A and to the inner side of the side bars 5. These wheel sections 26 have their rims tapering inwardly as is illustrated to advantage in Figure 2. A cross bar 28 between the rear end portions of the side bars 5 support the wheel scraper 29 which inclines downwardly and forwardly between the rims of the wheels 26.

The distributing container A includes a hub 30 on a square portion 25' of the shaft 25 and frusto-conical sides 31 between the outer nearer edges of which is an annular rim 32 having a plurality of necks 33 radiating outwardly and externally threaded to receive caps 34 which hold in place the disks 35 having openings 36 therein depending upon the size of the seeds. Several of these disks are illustrated in Figure 7.

From the above detailed description it will readily be apparent that as this apparatus is pulled along the depth of the digging element 11 may be regulated by proper adjustment of the hitch means 12 and by rocking the handle bars 18. As the wheels rotate the container A rotates and drops the seeds through the neck at regular intervals. The rake will drag along behind regardless as to how the apparatus has been built.

It is thought that the construction, operation, utility and advantages of this invention will now be quite apparent to those skilled in this art without a more detailed description thereof.

The present embodiment of the invention has been described with considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A seed planter comprising a wheeled frame, a seed container rotatably supported in the frame and comprising a hub, a pair of frusto-conical disks connected with the hub at their centers with their peripheries slightly spaced apart, a ring connected with the peripheries of the disks and filling the space between such peripheries, a plurality of radially extending necks integrally connected with the ring, the outer end of each neck being threaded, a disk resting on the outer end of each neck and having a seed outlet opening at its center and a cap threaded to each neck and holding the disk thereon whereby seeds will drop through the outlet opening as the necks are brought to the bottom of the container during the rotation thereof, and means for rotating the container.

In testimony whereof I affix my signature.

WILLIAM A. FILLINGIM.